April 15, 1930.  F. ZACHARIAS  1,754,812
BAKER'S PAN
Filed July 17, 1929
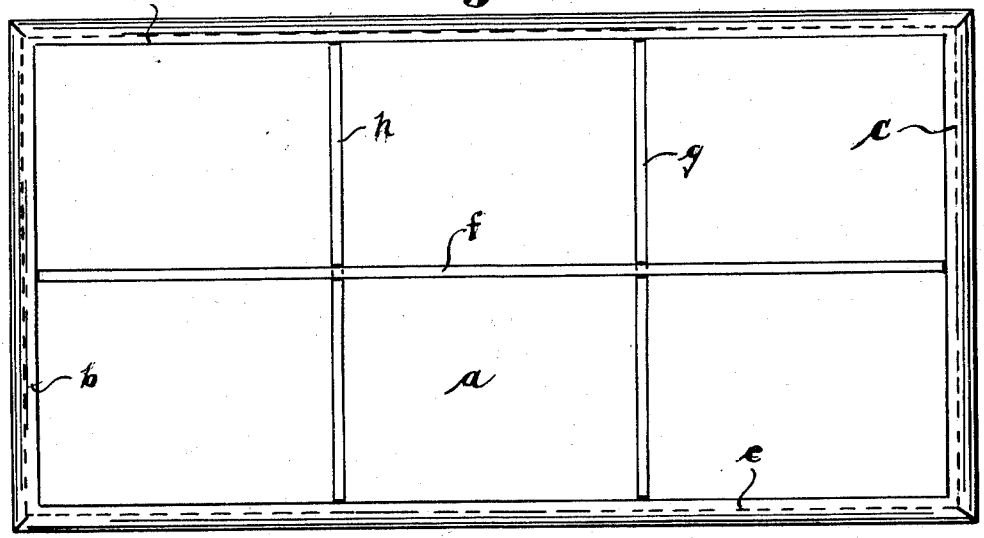
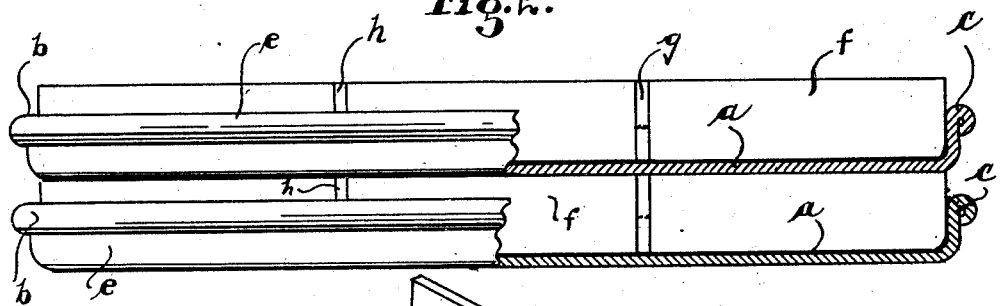
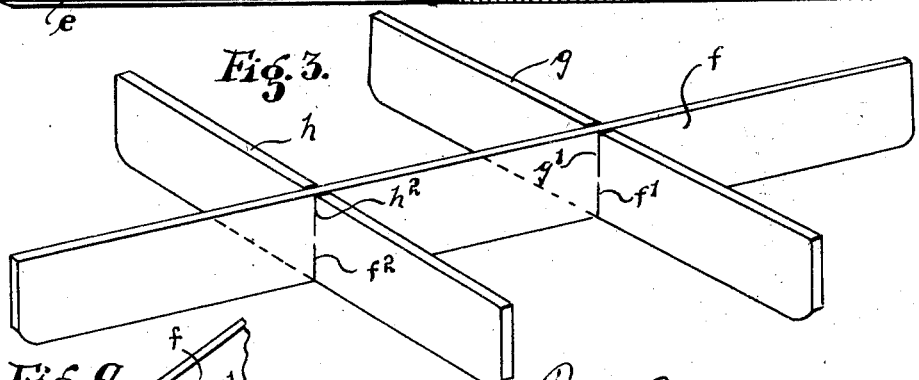
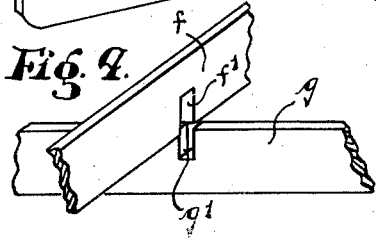
Fred Zacharias
INVENTOR
BY
ATTORNEY Patented Apr. 15, 1930

1,754,812

UNITED STATES PATENT OFFICE

FRED ZACHARIAS, OF MINEOLA, NEW YORK, ASSIGNOR TO HIMSELF AND ALBERT C. EGGERTS, OF MINEOLA, NEW YORK

BAKER'S PAN

Application filed July 17, 1929. Serial No. 378,822.

My invention relates to bakers' pans, and more particularly to a pan for use in the production of coffee cakes or like articles.

Heretofore in the baking industry it has been the practice to mix the dough used in the making of coffee cakes, and proof and bake it as a unit in a large pan, the baked cake being cut into the desired number of pieces of the desired size after the removal of the pan from the oven. When following this procedure there is not only likelihood of different portions of the cake in the pan being baked to a varying degree, but the individual cakes cut from the large cake, present edges which readily dry out, so that with very slight ageing of the cake there is an apparent staleness which does not, in fact, exist. There is also likelihood of loss, due to the breaking of the crust when cutting the cake, or particularly with the so-called "crumb" coffee cakes, of the cake falling toward the center of the pan with a resultant loss to the baker.

With the old practice, using a large bake pan, each of the pans must be left upon the table or bench, or be placed in a rack during proofing, which requires the provision of considerable space in a bake shop where the production of coffee cakes is even fairly small.

With the above conditions in mind, I have produced a baker's pan especially adapted for use in the production of coffee cakes, which pan can be used, not only to more effectively proof the product, but to avoid wastage due to improper baking and possible falling of any portion of the cake in a pan. Furthermore, in a pan embodying the invention, a plurality of cakes of the desired commercial size may be produced, each of which cakes will have substantially the same qualities as every other, thus avoiding loss due to the cutting of a cake baked as a unit in a pan. Each of the cakes of commercial size baked in a pan embodying my invention, may be removable therefrom with ease, ready for distribution without cutting and without unnecessary handling.

The invention consists primarily in a baker's pan embodying therein a metallic dish having sides of a height approximately that of the thickness of a cake to be baked therein, and a frame removably mounted in said dish consisting of parting plates extending longitudinally and laterally of said dish and of a height relatively greater than the sides of the dish, whereby said dish is divided into a plurality of separate compartments and said plates project above the sides of said dish and the tops of cakes baked therein; and in such other novel features of construction and combination of parts as are hereinafter set forth and described, and more particularly pointed out in the claims hereto appended.

Referring to the drawings—

Fig. 1 is a plan view of a baker's pan embodying my invention;

Fig. 2 is a side view partly broken away showing two of such pans stacked for proofing purposes;

Fig. 3 is a perspective view of a removable frame, separate from the pan proper; and Fig. 4 is a view showing the manner of connecting the plates of the frame.

Like letters refer to like parts throughout the several views.

In the embodiment of the invention shown in the drawings, the dish proper is of the construction usually employed in bake shops and may be of any desired dimensions. This dish has a bottom portion $a$ and sides $b$, $c$, $d$ and $e$ of a height approximately that of the thickness of a cake to be baked in the pan. The top of the sides of said dish may be reinforced by beading in the usual manner.

I have illustrated the invention in connection with a pan for producing six substantially rectangular coffee cakes, the dish proper having positioned therein a frame embodying therein parting plates dividing the interior of the dish into the desired number of independent compartments. This frame consists of a longitudinally extending parting plate $f$, having secured thereto a plurality of transversely extending parting plates $g$ and $h$. While the plates of this frame are preferably made of fairly thin sheet metal, other materials may be used if desired.

The longitudinally extending plate $f$ extends from closely adjacent one of the sides $b$ to closely adjacent the opposite side $c$, while the plates $g$ and $h$ extend from closely adjacent the side $d$ to closely adjacent the side $e$. This close fitting of the frame affords a plurality of independent non-communicating compartments so that the dough in each compartment, during proofing, will not become attached to the dough in other compartments to an extent to interfere with the free removal from the pan of the cakes formed of said dough.

The frame, consisting of the plates $f$, $g$ and $h$, rests upon the bottom of, and is removable from, the dish, so that upon the completion of the baking of a batch of dough in a pan, the frame, in its entirety, may be removed from the dish, thus leaving the baked cakes in a condition where they may be removed by hand or by means of a spatula from the dish without any cutting, the cake so removed being ready for immediate delivery.

The plates $f$, $g$ and $h$ are of a height relatively greater than the heights of the sides of the dish, or of the thickness of a cake to be baked in the pan. The purpose of this is two-fold, to wit: to facilitate proofing and permit the convenient removal of the frame from the pan by merely grasping the portions of the frame projecting above the cake.

At the point of intersection of the plates $f$, $g$ and $h$ respectively, these plates are cut for approximately one-half of their depth so that they will match together and permit them to be secured at the top and bottom where there will be no rough spots which will interfere with the withdrawal of the frame. This construction is shown in Fig. 4 in connection with the plates $f$ and $g$, one of the slots being shown at $f'$ and the other at $g'$. A slot $f^2$ coöperates with a slot $h^2$ as indicated in Fig. 3.

In the use of a pan embodying the invention, the procedure is substantially as follows:—

A frame having been properly seated in the dish, the bottom and sides of the dish and the plates of the frame are greased in the usual manner. A batch of dough, sufficient to make a cake approximating that made by former methods in a pan of the size of the dish used, is divided into a number of equal portions, corresponding with the number of compartments formed within the pan by the frame, and each portion of the dough is put in a compartment. When all of the compartments are filled, a second pan is similarly filled and placed on top of the other pan, resting upon the projecting tops of the parting plates of the frame. A considerable number of pans may thus be stacked upon a table, all of the pans so stacked occupying merely the space required for a single pan.

When the pans are so stacked, they are left for the time required for proofing, air being free to circulate between the superimposed pans to facilitate proofing. After the dough has been properly proofed, the desired number of pans are placed in the oven for the required time. The heat during the baking operation will not only sear the portions of the dough in contact with the bottom $a$ and sides $b$, $c$, $d$ and $e$, but also those portions of the dough in contact with the parting plates $f$, $g$ and $h$ of the frame, since these plates will readily absorb and transmit heat.

After the dough has been properly baked, the pans are removed from the oven, and while the cake is still hot, the baker grasps the projecting portions of the plates of the frame and lifts this from the dish, leaving a plurality of independent, separate cakes, corresponding in size and in quality, in the pan, from which they may be removed as required without the use of a knife.

I have found, in actual practice, that with a pan embodying the invention, the transmission of heat through the plates of the frame, and the separation of the different portions of the dough within a dish by said plates, avoids the possibility of the falling of any portion of the cake during or following baking.

Furthermore, the light crust entirely about the cakes baked in each compartment due to the presence of the frame, tends to preserve the appearance and quality of freshness throughout and about each cake. By using a pan embodying the invention, I have found that it is possible to produce coffee cakes of uniform lightness and quality as to every portion of every batch of dough, it being understood that when I refer to a "batch of dough," I mean a quantity sufficient to fill all of the compartments of a pan.

The removability of the frame is primarily for the purpose of permitting it to be lifted from the cakes in a pan as described, ease of cleaning both the dish and the frame by reason of such removability being of secondary importance.

It is not my intention to limit the invention to the dimensions of the dish, or to the number and length of the plates forming the frame. It is possible, with the use of a frame such as I have described, to increase the size of the dish as compared with those now commonly used, the size of the latter having been determined largely by the maximum dimensions permissible without likelihood of falling of the cake at the center. As stated, the presence of the partition, and the transmission of the heat therethrough to the dough during baking and well within the pan has the effect of minimizing likelihood of the falling of the cake in any particular compartment, irrespective of the number of such compartments formed by a frame.

Having described the invention, what I claim as new and desire to have protected by Letters Patent, is:—

1. A baker's pan embodying therein a metallic dish having sides of a height approximately that of the thickness of a cake to be baked therein, and a frame removably mounted in said dish consisting of parting plates extending longitudinally and laterally of said dish and of a height relatively greater than the sides of the dish, whereby said dish is divided into a plurality of separate compartments and said plates project above the sides of said dish and the tops of cakes baked therein.

2. A baker's pan embodying therein a metallic dish having sides, and means dividing said dish into a plurality of non-communicating compartments and projecting above the sides of said dish, whereby in stacking a plurality of pans when proofing, air space is afforded between said pans, and gripping areas are afforded for removing said frame from said dish.

3. A baker's pan embodying therein a metallic dish having sides of a height approximately that of the thickness of a cake to be baked therein, and a frame removably mounted in said dish consisting of a metallic parting plate extending longitudinally of, and into close engagement with, opposite sides of said dish, and metallic plates secured to said first named plate extending laterally of, and closely adjacent the other opposite sides of, said dish, said plates being of a height relatively greater than the sides of the dish, said frame dividing said dish into a plurality of non-communicating compartments and affording space between a plurality of piled pans to facilitate proofing, and affording gripping areas for removing said frame from said dish.

In witness whereof I have hereunto affixed my signature this 12th day of July, 1929.

FRED ZACHARIAS.